United States Patent
Wiggins et al.

(10) Patent No.: US 9,545,060 B2
(45) Date of Patent: *Jan. 17, 2017

(54) GROWTH CHAMBER CAROUSEL

(71) Applicant: DOW AGROSCIENCES LLC, Indianapolis, IN (US)

(72) Inventors: Barry Wiggins, Westfield, IN (US); Dawn M. Parkhurst, Westfield, IN (US); Michael Vercauteren, Avon, IN (US)

(73) Assignee: Dow Agrosciences LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,441

(22) Filed: Mar. 23, 2015

(65) Prior Publication Data
US 2015/0223408 A1 Aug. 13, 2015

Related U.S. Application Data

(63) Continuation of application No. 13/778,959, filed on Feb. 27, 2013, now Pat. No. 9,010,018.
(Continued)

(51) Int. Cl.
*A01G 9/20* (2006.01)
*A01G 9/14* (2006.01)
(Continued)

(52) U.S. Cl.
CPC . *A01G 9/14* (2013.01); *A01G 9/20* (2013.01); *A01G 31/047* (2013.01); *A01G 9/26* (2013.01); *Y02P 60/216* (2015.11)

(58) Field of Classification Search
CPC .......... A01G 9/14; A01G 9/022; A01G 9/023; A01G 9/047; A01G 31/04; A01G 31/042; A01G 31/047
(Continued)

(56) References Cited

U.S. PATENT DOCUMENTS 3,529,379 A  9/1970 Ware
3,824,736 A * 7/1974 Davis ............... A01G 7/045
                                                        47/17
(Continued)

FOREIGN PATENT DOCUMENTS

FR  2345912 A1  10/1977
FR  2680074 A1  2/1993

OTHER PUBLICATIONS

Town, Rotating Hydroponic Vertical Farming, Sustainable Cities Collective, Nov. 16, 2009.

*Primary Examiner* — Monica Williams
*Assistant Examiner* — Michael A Fabula
(74) *Attorney, Agent, or Firm* — Eric J. Kraus; Faegre Baker Daniels LLP

(57) ABSTRACT

A growth chamber carousel is provided which may be used to grow plants in a chamber. The chamber includes an artificial light source, a plurality of plant supports, a supporting structure configured to rotate the plant supports between two positions, the first position being closer to the artificial light source than the second, and a divider separating the chamber into a light region containing the artificial light source and one of the plant supports in the first position and a dark region containing the other plant support in the second position. The divider is moveable between a first divider position in which the divider prevents movement of the plant supports and a second divider position in which the divider does not prevent movement of the plant supports.

8 Claims, 11 Drawing Sheets

Related U.S. Application Data

(60) Provisional application No. 61/616,138, filed on Mar. 27, 2012.

(51) Int. Cl.
*A01G 31/04* (2006.01)
*A01G 9/26* (2006.01)

(58) Field of Classification Search
USPC .............. 47/17, 39, 58.1 LS, 63, 65, 82, 83
See application file for complete search history.

(56) References Cited

U.S. PATENT DOCUMENTS

| | | | |
|---|---|---|---|
| 3,909,978 A | 10/1975 | Fleming | |
| 4,028,847 A * | 6/1977 | Davis .................. | A01G 31/042 165/59 |
| 4,068,405 A * | 1/1978 | Campbell ............ | A01G 31/045 47/65 |
| 4,085,544 A | 4/1978 | Blake | |
| 4,163,342 A | 8/1979 | Fogg et al. | |
| 4,255,897 A | 3/1981 | Ruthner | |
| 5,287,562 A | 2/1994 | Delp | |
| 5,287,652 A | 2/1994 | Delp | |
| 5,515,648 A | 5/1996 | Sparkes | |
| 5,584,141 A | 12/1996 | Johnson | |
| 5,617,673 A * | 4/1997 | Takashima ........... | A01G 31/047 47/39 |
| 6,557,491 B1 | 5/2003 | Weiser et al. | |
| 6,604,321 B2 | 8/2003 | Marchildon | |
| 7,086,198 B2 * | 8/2006 | Hayden ............... | G07F 17/0042 221/119 |
| 7,168,206 B2 | 1/2007 | Agius | |
| 7,818,917 B2 | 10/2010 | Brusatore | |
| 8,104,226 B2 * | 1/2012 | Marchildon ......... | A01G 31/047 47/39 |
| 9,010,018 B2 | 4/2015 | Wiggins et al. | |
| 2004/0256000 A1 * | 12/2004 | Konstantin .............. | A01G 9/22 136/251 |
| 2005/0180608 A1 * | 8/2005 | Tanabata .................. | A01G 7/00 382/110 |
| 2006/0150481 A1 | 7/2006 | Hung et al. | |
| 2006/0196118 A1 * | 9/2006 | Brusatore ............ | A01G 31/047 47/83 |
| 2007/0251145 A1 * | 11/2007 | Brusatore ............ | A01G 31/047 47/83 |
| 2008/0110088 A1 * | 5/2008 | Brusatore ............ | A01G 31/047 47/79 |
| 2008/0256854 A1 | 10/2008 | McIlvenna | |
| 2010/0236147 A1 * | 9/2010 | Brusatore ............ | A01G 31/047 47/59 R |
| 2001/0209402 | 9/2011 | Hu | |
| 2013/0104456 A1 | 5/2013 | Smith | |
| 2013/0125459 A1 | 5/2013 | Nelson et al. | |
| 2013/0255145 A1 * | 10/2013 | Wiggins ................... | A01G 9/20 47/17 |
| 2014/0026481 A1 * | 1/2014 | Podmajersky ........... | A62C 5/02 47/62 N |
| 2015/0000191 A1 * | 1/2015 | Nagadome ............ | A01G 9/26 47/66.6 |
| 2015/0059243 A1 * | 3/2015 | Parker .................. | A01G 31/047 47/66.6 |

\* cited by examiner

US 9,545,060 B2

GROWTH CHAMBER CAROUSEL

RELATED APPLICATION

This application is a continuation of U.S. patent application Ser. No. 13/778,959, filed Feb. 27, 2013, titled GROWTH CHAMBER CAROUSEL, which claims the benefit of U.S. Provisional Application Ser. No. 61/616,138, filed Mar. 27, 2012, the entire disclosures of which are expressly incorporated herein by reference.

FIELD

The present invention relates to methods and apparatus for growing plants under controlled conditions and in particular to methods and apparatus for growing plants contained in a growth chamber.

BACKGROUND

Soybeans and other plants are photoperiodic, meaning they can be forced to flower by controlling the duration of light and dark exposure. A growth chamber where temperature, humidity, and light duration are controlled can be used to effectively grow photoperiodic plants at a faster rate indoors than outdoors.

In a typical growth chamber, a single layer of plants is exposed to an artificial light. The artificial light is turned on to expose the plants to light and off to expose the plants to darkness. Providing a second layer of plants would allow growth chamber space to be used more efficiently where a first layer is exposed to light, a second layer is exposed to darkness, and the plants can be moved between the two positions.

SUMMARY

In an exemplary embodiment of the present disclosure, a chamber for growing plants is provided. In one embodiment, the chamber includes an artificial light source, first and second plant supports, a supporting structure configured to rotate the plant supports between two positions, the first position being closer to the artificial light source than the second position, and a divider separating the chamber into a light region containing the artificial light source and one of the plant supports in the first position and a dark region containing the other plant support in the second position, wherein the divider is moveable between a first divider position in which the divider prevents movement of the plant supports between the first and second position by the supporting structure and a second divider position in which the divider does not prevent movement of the plant supports by the supporting structure between the first and second position.

In another exemplary embodiment of the present disclosure, the chamber includes a plurality of divider portions moveable between a storage position allowing the moveable member to move the first and second plant supports between their respective first and second positions and light blocking position blocking the moveable member from moving the first and second plant supports between their respective first and second positions, wherein when the first and second plant supports are in their first positions, the artificial light source illuminates the first plant support and first plant support and divider portions cooperate to block light from the artificial light source from reaching the second plant support and when the first and second plant supports are in their second positions, the artificial light source illuminates the second plant support and the second plant support and divider portions cooperate to block light from the artificial light source from reaching the first plant support.

In still another exemplary embodiment of the present disclosure, a method of growing plants in a chamber is provided. In one embodiment, the method includes supporting a plant with one of a first plant support and a second plant support, the plant supports being attached to a moveable member; positioning the moveable member in a first position wherein the first plant support is nearer the artificial light source than the second plant support; illuminating the first plant support with light from the artificial light source while blocking the light from the artificial light source from illuminating the second plant support with a divider in a light blocking position between the first plant support and the second plant support when the moveable member is in the first position; positioning the divider in a storage position; positioning the moveable member in a second position wherein the second plant support is nearer the artificial light source than the first plant support; and illuminating the second plant support with light from the artificial light source while blocking the light from the artificial light source from illuminating the first plant support with a divider in a light blocking position between the first plant support and the second plant support when the moveable member is in the second position; wherein when the divider is in the light blocking position, the moveable member cannot move between the first and second position.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to the growing photoperiodic plants under controlled conditions, it should be understood that the features disclosed herein may have application to the preparation of other types of samples.

Figure 1:
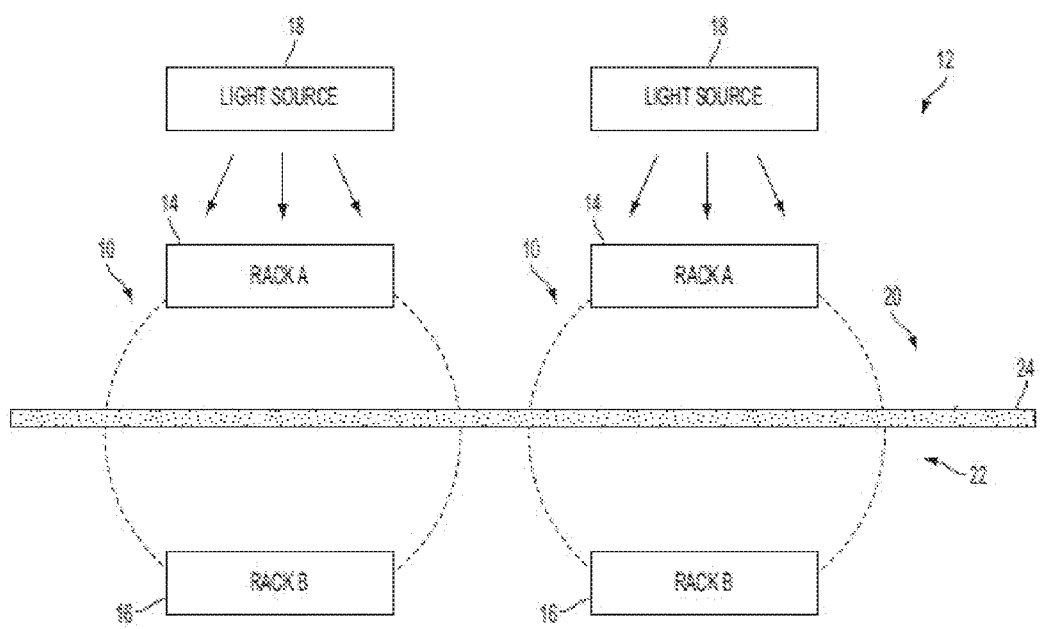
FIG. 1 illustrates two exemplary carousels each with two racks in a first position inside a growth chamber.

Referring to FIG. 1, two exemplary supporting structures, illustratively carousels 10, are illustrated in a growth chamber 12. In one exemplary embodiment, growth chamber 12 includes an interior in which light duration and at least one of temperature and humidity are controlled. In another exemplary embodiment, growth chamber 12 includes an interior in which light duration, temperature, and humidity are controlled. Although a carousel is illustrated, other supports may be used.

In one embodiment, each exemplary carousel 10 includes two plant supports, illustratively rack 14 and rack 16. Each rack 14, 16 is rotatably attached to carousel 10 so that as carousel 10 rotates around an axis, rack 14, 16 remains oriented in the same direction. Each rack 14, 16 provides a location for growing plants. In one example embodiment, the racks support pots for growing plants. In another example embodiment, plants may be grown directly in racks 14, 16.

As shown in FIG. 1, at least one light source 18 is provided. In one exemplary embodiment, light source 18 is provided as part of growth chamber 12. In another exemplary embodiment, light source 18 is provided in the interior of growth chamber 12. In the first position illustrated in FIG. 1, light source 18 provides light to rack 14 in the growth chamber. In one exemplary embodiment, light source 18 includes a single light source. In another exemplary embodiment, light source 18 is comprised of a plurality of light sources. In yet another example embodiment, light source 18 is comprised of a plurality of light sources, each light source associated with at least one carousel 10.

Growth chamber 12 is divided into light region 20 and dark region 22 by blackout divider 24. As illustrated in FIG. 1, when blackout divider 24 is in a light blocking position and carousel 10 is positioned such that rack 14 is in light region 20, rack 16 will be in dark region 22 when light source 18 is producing light. As shown in FIG. 1, plants located in rack 14 receive light from light source 18, while blackout divider 24 prevents light from reaching plants located in rack 16.

In one embodiment, blackout divider 24 is any material that reduces light transmission from light source 18 to dark region 22. In another embodiment, blackout divider 24 is a cloth or fabric mesh that reduces light transmission from light source 18 to dark region 22. In still another embodiment, blackout divider 24 is resistant to weather, UV and mold. In yet still another embodiment, blackout divider 24 is a climate screen, such as blackout type screens available from Svensson, Kinna, Sweeden. In one embodiment, blackout divider 24 has a direct light transmission low enough to not alter a target plant's photoperiod. In another embodiment, blackout divider 24 has a direct light transmission of up to about 1% or up to about 0.1%. In still another embodiment, blackout divider 24 prevents light from light source 18 from transmitting to dark region 22 by reflecting the light back into region 20. Other suitable materials for reducing light in dark region 22 may also be used.

Figure 2:
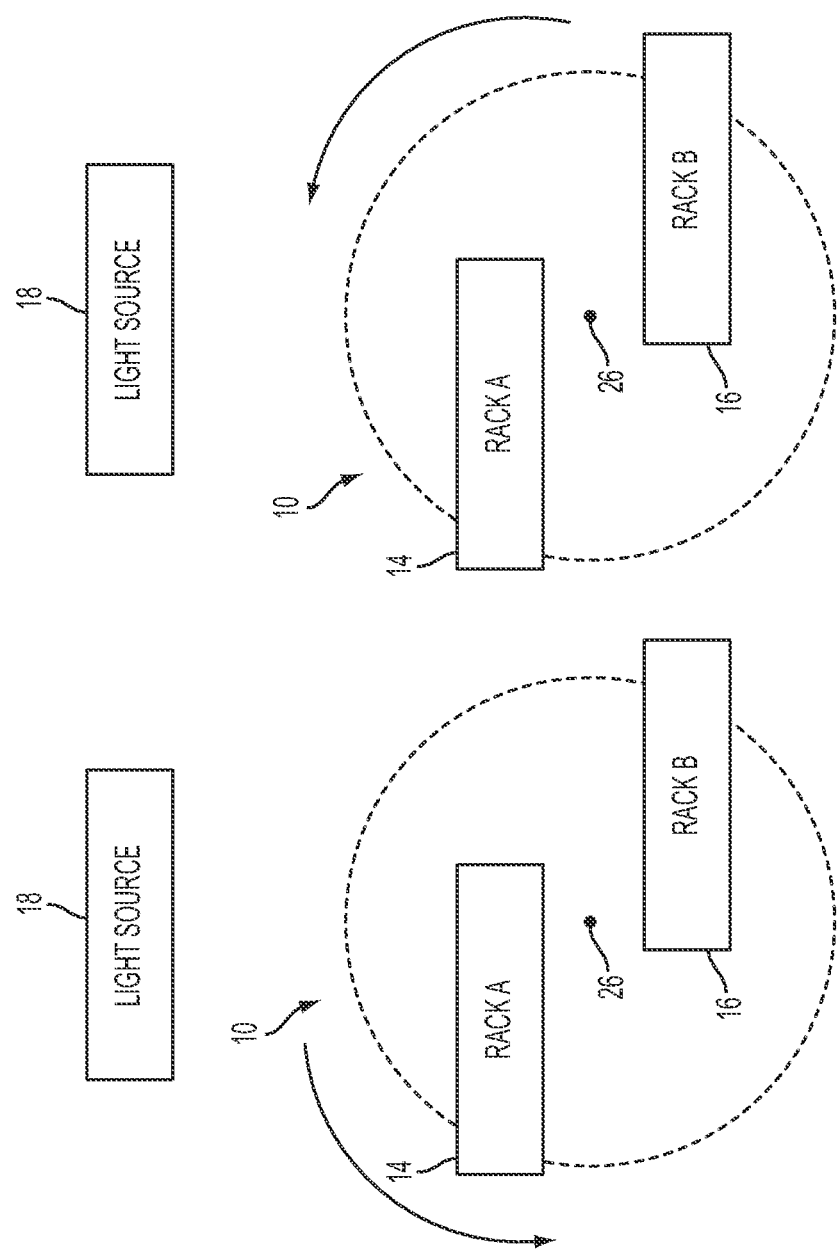
FIG. 2 illustrates rotating the two carousels of FIG. 1 between a first position and a second position.

Referring to FIG. 2, when a desired light duration has been reached, carousels 10 are rotated to exchange the position of rack 14 and rack 16. Light source 18 has been turned off and blackout divider 24 has been positioned in a storage position not between rack 14 and rack 16. As the carousels rotate about axis 26, each of racks 14, 16 remains in the same orientation while moving to a new position.

Figure 3:
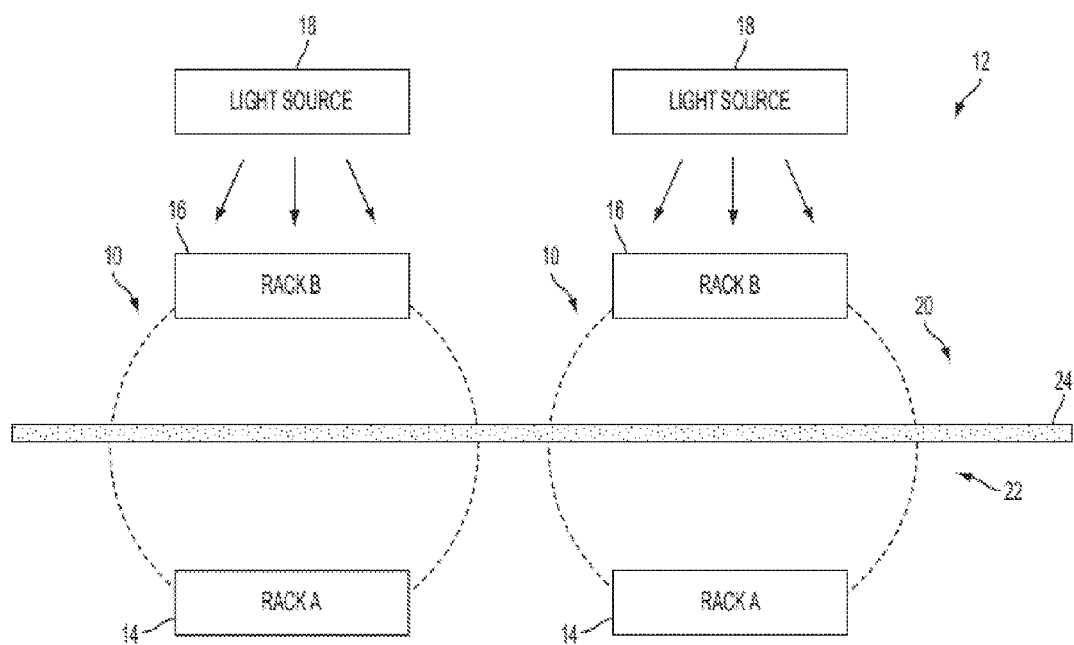
FIG. 3 illustrates the two carousels of FIG. 1 in a second position inside a growth chamber.

In one exemplary embodiment, as shown in FIG. 3, carousels 10 are rotated to a second position in which rack 14 and rack 16 have traded places. Blackout divider 24 is placed in a light blocking position and light source 18 is turned back on. Rack 16 has been positioned in light region 20 above blackout divider 24 and rack 14 has been positioned in dark region 22 below blackout divider. As shown in FIG. 3, plants located in rack 16 receive light from light source 18, while blackout divider 24 in a light blocking position prevents light from reaching plants located in rack 14. In another exemplary embodiment, rack 14 moves from a first position in light region 20 to a second position in dark region 22 while rack 16 moves from a first position in dark region 22 to a second position in light region 20. In still another exemplary embodiment, light source 18 is not turned off during the positioning of blackout divider 24 in a storage position and rotation of carousels 10.

In one exemplary embodiment, when the blackout divider 24 is in the light blocking position, the carousels 10 cannot move racks 14, 16 between a first position in the light region 20 and a second position in dark region 22 of growth chamber 12. In this embodiment, blackout divider 24 must be moved to a storage position prior to the carousel 10 moving racks 14, 16 between the first and second positions.

In another exemplary embodiment, racks 14, 16 are attached to an endless chain system (not shown) instead of carousel 10, with a light source 18 being located closer to rack 14 than to rack 16. When blackout divider 24 is positioned in a first position between rack 14 and rack 16, rack 14 is illuminated from light from the light source 18 and blackout divider 24 prevents rack 16 from receiving light from light source 18. Once blackout divider 24 has been moved to a second position, endless chain system moves racks 14, 16, moving rack 16 to a position closer to light source 18 than rack 14. Blackout divider 24 is positioned back in a first position between racks 14, 16 wherein rack 16 is illuminated from light from light source 18 and blackout divider 24 prevents rack 14 from receiving light from light source 18. When blackout divider 24 is in the light blocking position, the endless chain system cannot move racks 14, 16 between a first position in light region 20 and a second position in dark region 22 of growth chamber 12. In this embodiment, blackout divider 24 must be moved to a storage position prior to the endless chain system moving racks 14, 16 between the first and second positions.

Other suitable moveable members besides carousels 10 and endless chain systems for moving racks 14, 16 supporting plants may also be used. In one exemplary embodiment, when the blackout divider 24 is in the light blocking position, the moveable member cannot move racks 14, 16 between a first position in the light region 20 and a second position in dark region 22 of growth chamber 12. In this embodiment, blackout divider 24 must be moved to a storage position prior to the moveable member moving racks 14, 16 between the first and second positions.

Figure 4:
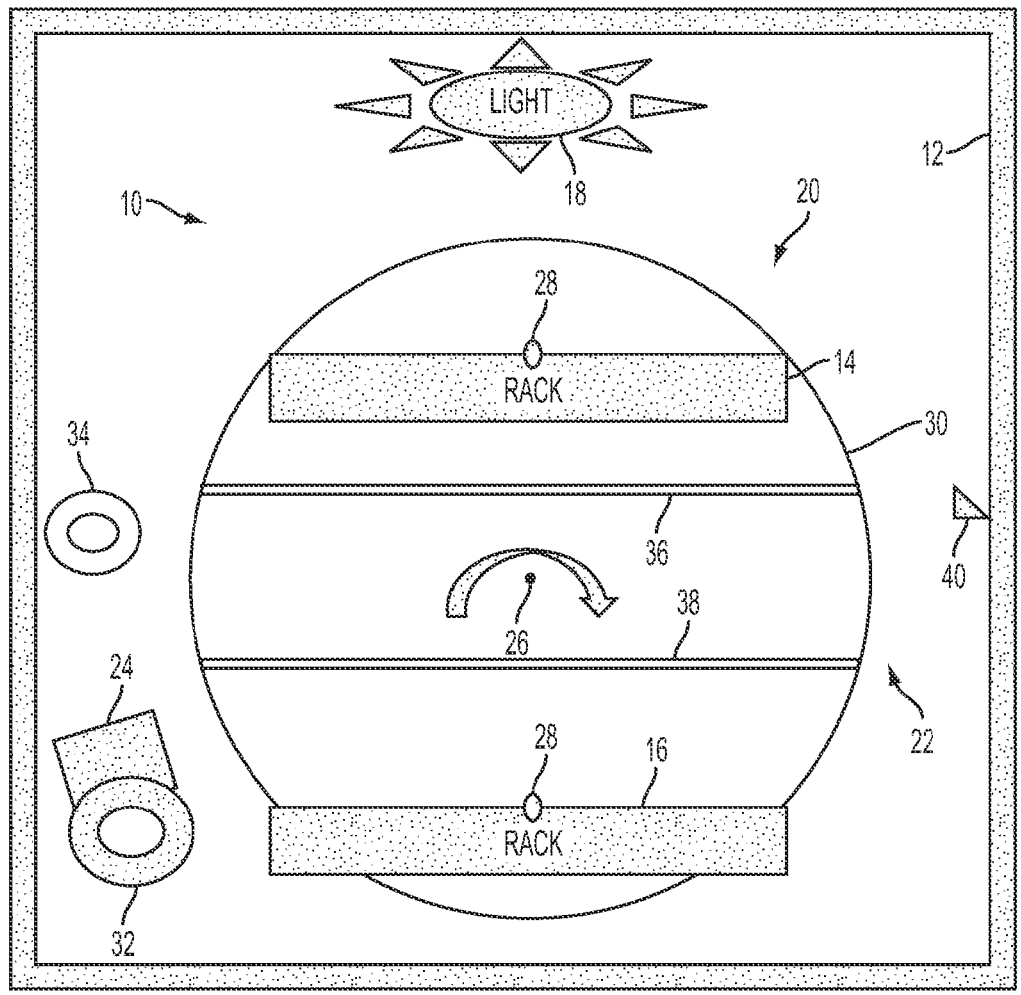
FIG. 4 illustrates a side view of another exemplary carousel inside a growth chamber.
Figure 5:
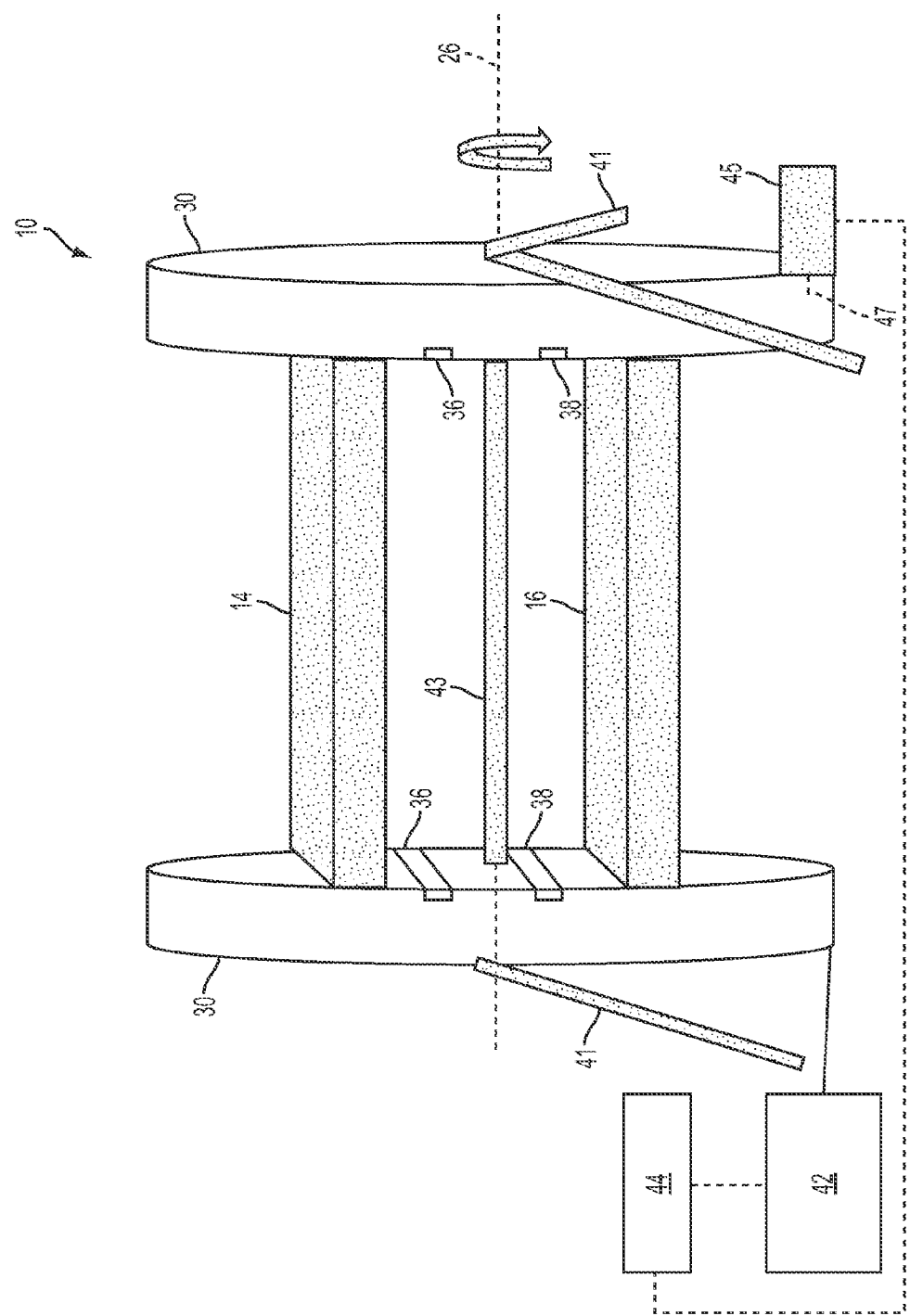
FIG. 5 illustrates a front view of the exemplary carousel of FIG. 4.

FIG. 4 illustrates a side cut-away view of an exemplary carousel 10 inside growth chamber 12. As shown in FIG. 5, the carousel is supported by a frame 41 which rests on a floor of the growth chamber 12. An exemplary frame 41 is shown in FIG. 5, although other suitable frames may also be used. The exemplary embodiment illustrated in FIG. 4 includes two racks 14, 16 rotatably attached to carousel 10 to allow racks 14, 16 to rotate about axis 28 as carousel 10 rotates about axis 26. In another embodiment, each rack 14, 16, includes a plurality of racks rotatably supported by axis 28. In still another embodiment, a single rack or more than two racks replaces racks 14, 16. Carousel 10 includes at least one carousel wheel 30 to which racks 14, 16 are attached. In one exemplary embodiment carousel 10 includes two carousel wheels 30 with racks 14 and 16 suspended between wheels 30. Light source 18 provides light to at least one of racks 14, 16.

In the exemplary embodiment illustrated in FIG. 4, growth chamber 12 can be divided into light region 20 and dark region 22 by blackout divider 24. In FIG. 4, blackout divider 24 is shown in a storage position where it does not block light to one of racks 14, 16.

An illustrative blackout divider 24 storage position is shown in FIG. 4: blackout divider 24 is rolled up on divider storage 32, illustratively a roller. In one exemplary embodiment, divider storage includes a roller or canister and a spring or other tensioning device to provide a force returning blackout divider 24 to storage. In another embodiment, divider storage 32 stores a folded blackout divider 24. In still another embodiment, blackout divider 24 includes a plurality of panels separated by strengthening members running across the length of blackout divider 24, and divider storage 32 supports the strengthening members, allowing the panels to hang between the strengthening members similar to a Roman shade. In yet still another embodiment, blackout divider 24 includes a plurality of rigid panels hinged together that allow blackout divider 24 to be positioned in divider storage 32 and moved into position dividing growth chamber 12 into light region 20 and dark region 22. Other suitable arrangements for embodiments for blackout divider 24 that allow it to be positioned in a storage position and moved to a light blocking light between racks 14, 16, and dividing growth chamber 12 into light region 20 and dark region 22 may be used.

In the exemplary embodiment shown in FIG. 4, support 34 is positioned near an interior wall of growth chamber 12. When blackout divider 24 is moved into position dividing growth chamber 12 into light region 20 and dark region 22, it is supported on one end by support 34. In one embodiment, support 34 is a roller. In another embodiment, first supporting roller is a pulley supporting blackout divider 24 in place. In still another embodiment, support 34 is at least one supporting arm supporting blackout divider 24 in place. In yet another embodiment, first supporting roller 34 is attached to the bottom or side walls of growth chamber 12.

In the exemplary embodiment illustrated in FIG. 4, guiding grooves 36, 38 are provided in carousel wheel 30. First guiding groove 36 and second guiding groove 38 are positioned on either side of axis of rotation 26. When rack 14 is positioned in light region 20, blackout divider 24 can be moved from a storage position in divider storage 32 to a light blocking position blocking light from rack 16, by positioning divider 24 around first supporting roller 34, through first guiding groove 36, and attaching divider 24 to divider attachment 40. When carousel 10 is oriented such that rack 16 is positioned in light region 20, blackout divider 24 is positioned around first supporting roller 34, through second guiding groove 38, and secured to divider attachment 40. In another embodiment, only one guiding groove is provided and blackout divider 24 is positioned around first supporting roller 34, through the guiding groove, and is secured to divider attachment 40. Guiding grooves 36, 38 allow blackout divider 24 to further reduce the amount of light from light source 18 reaching dark region 22 when blackout divider 24 is in a second position blocking light from one of racks 14, 16. In still another exemplary embodiment, no guiding grooves are provided.

FIG. 5 illustrates a front view of the exemplary carousel of FIG. 4. Racks 14, 16, are rotatably attached to carousel wheels 30. Carousel wheels 30 rotate about axis of rotation 26. As shown in FIG. 4, blackout divider 24 extends between carousel wheels 30, blocking light from rack 16 and dividing growth chamber 12 into light region 20 and dark region 22. In one exemplary embodiment, edges of blackout divider 24 are positioned in one of guiding grooves 36, 38 in carousel wheels 30 when blackout divider 24 is extended.

In one exemplary embodiment, one of carousel wheels 30 are rotated by carousel motor 42 controlled by controller 44, the one wheel 30 being fixably engaged to the other wheel 30. In another exemplary embodiment, carousel motor 42 includes motors attached to both carousel wheels 30. In still another exemplary embodiment, carousel wheels 30 are rotated manually.

In one exemplary embodiment, motor 42 engages one of carousel wheels 30, which is fixably connected to the other wheel 30. In another exemplary embodiment, motor 42 engages carousel wheel 30 by rotating axle 43 fixably connected to both carousel wheels 30 and running through axis 26. In still another exemplary embodiment, motor 42 engages the exterior surface of carousel wheel 30. In yet still another exemplary embodiment, motor 42 includes a gear that engages teeth included on wheel 30. Other suitable arrangements for rotating wheels 30 with motor 42 may also be used.

In another exemplary embodiment, an engagable stop 45 is disengaged to allow carousel wheels 30 to rotate and engage to prevent carousel wheels 30 from rotating. In one exemplary embodiment, controller 44 controls the engagement and disengagement of stop 45. In another exemplary embodiment, stop 45 frictionally engages wheel 30 to prevent rotation. In still another exemplary embodiment, stop 45 includes a pin 47 to engage a recess (not shown) in carousel wheel 30. In yet another exemplary embodiment, carousel motor 42 is the stop.

In still yet another exemplary embodiment, carousel motor 42 includes an encoder to determine when to engage engageable stop. In another exemplary embodiment, stop 45 engages a recess in wheel 30, sending a signal to controller 44 to stop rotation of wheel 30. Other methods of determining when a rotational position of wheel 30 or other moveable member has been reached may be used.

Figure 6:
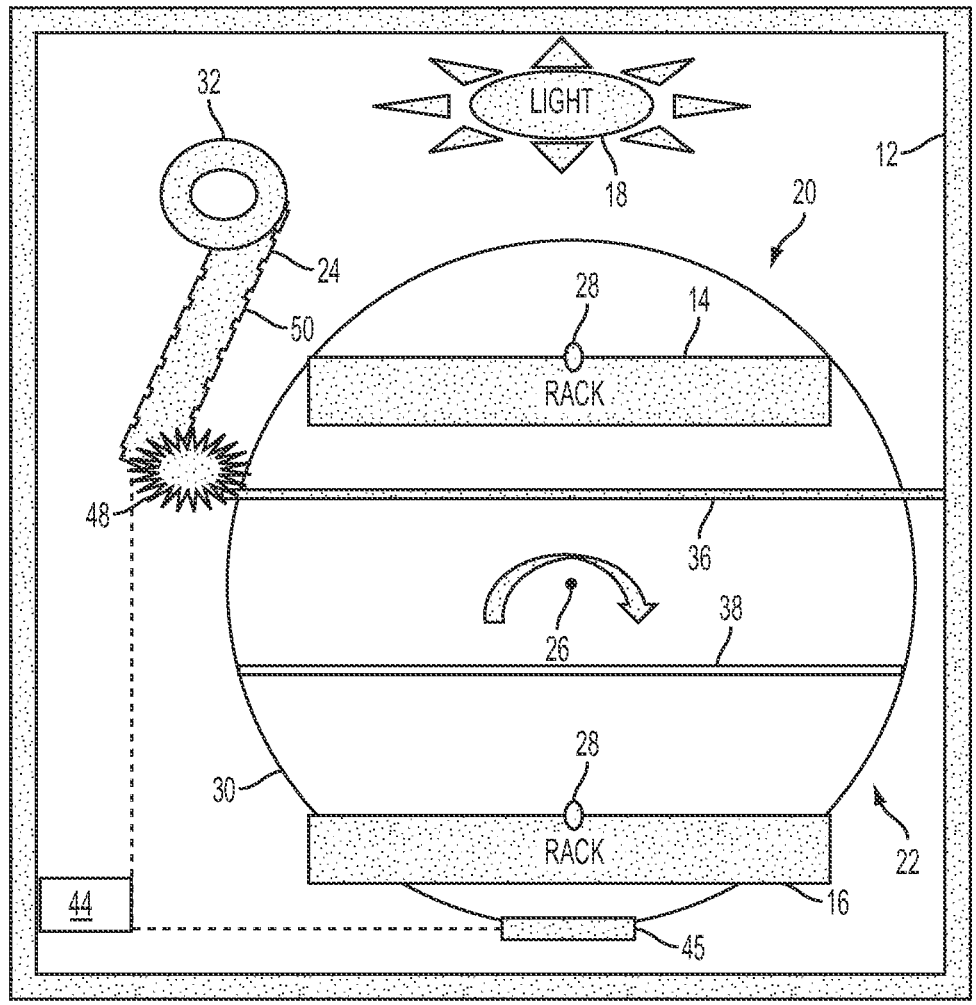
FIG. 6 illustrates an exemplary carousel including a first exemplary automatically positioned blackout divider inside a growth chamber.

FIG. 6 illustrates another exemplary embodiment of a carousel including an automatically positioned blackout divider 24. Blackout divider 24 is moved by engaging member 48 between a first position in divider storage 32 and a second position dividing growth chamber 12 between light region 20 and dark region 22. In one exemplary embodiment, engaging member 48 includes a motor controlled by controller 44. In another exemplary embodiment, multiple engaging members 48 engage edge 50 of blackout divider 24, each engaging member 48 being controlled by controller 44.

Figure 7:
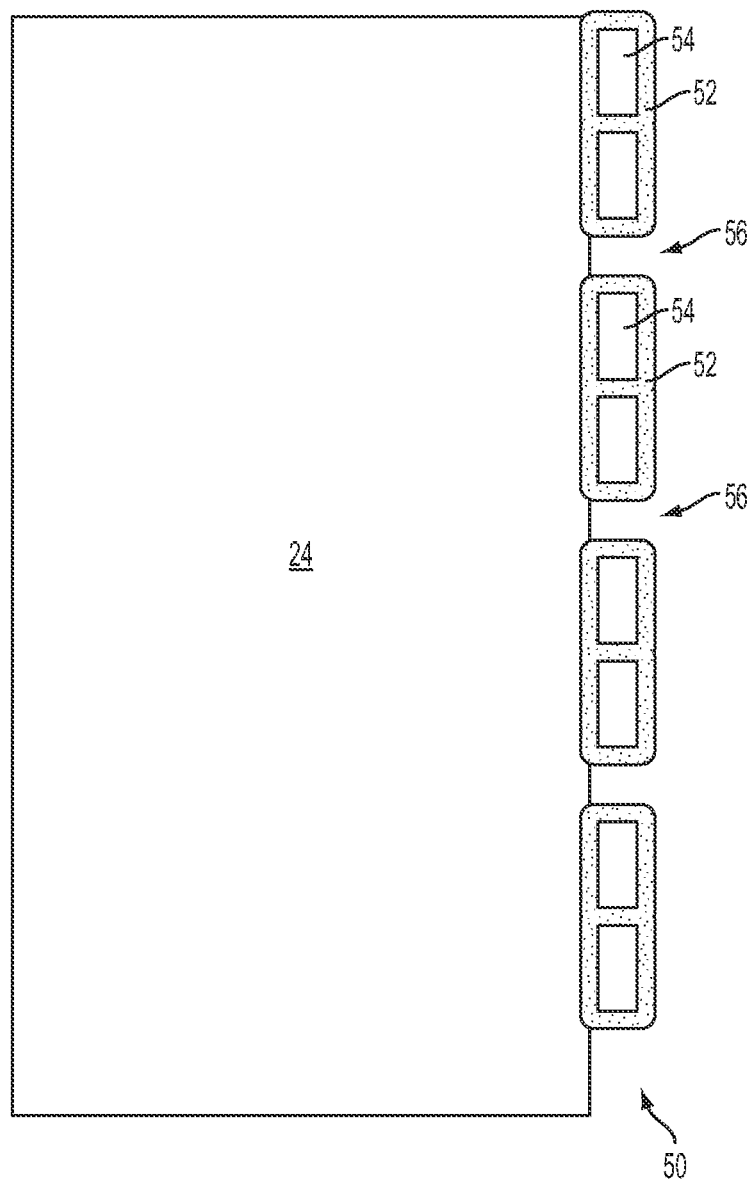
FIG. 7 illustrates an exemplary edge for an automatically positioned blackout divider.

FIG. 7 illustrates an exemplary edge 50 for an automatically positioned blackout divider 24. Edge 50 includes a plurality of links 52 attached to edge 50. The exemplary edge 50 illustrated in FIG. 7 has links 52 having a pair of openings 54 separated by a similarly sized gap 56. In another exemplary embodiment, links 52 include only a single opening 54. In still another exemplary embodiment, links 52 are not separated by gap 56. In one embodiment, links 52 are formed from metal, plastic, or other rigid material. In this embodiment, links 52 may be hingably or rotatably attached to each other to allow force to be transferred from one link to another, moving blackout divider 24 with them, but still allow blackout divider 24 to be rolled or folded when positioned in divider storage 32. In another embodiment, links 52 are formed in a rigid edge of blackout divider 24. In one embodiment, engaging member 48 engages links 52, causing the movement of blackout divider 24. In one embodiment, engaging member 48 is a sprocket that includes teeth that align with openings 54 in links 52 and gap 56. In another embodiment, engaging member 48 is a sprocket that includes teeth that align only with openings 54 in links 52. In still another embodiment, engaging member 48 includes teeth that align with depressions in links 52 and gap 56. In yet still another embodiment, engaging member includes a pair of wheels above and below blackout divider 24 that frictionally engage edge 50. Other suitable engaging members 48 may be used.

As engaging member 48 rotates, blackout divider 24 is advanced into or retracted from between carousel wheels 30. In one exemplary embodiment, edge 50 feeds into guiding groove 36 or 38 depending on the orientation of carousel wheels 30. In one embodiment, guiding grooves 36, 38 include a lip to exert a lateral force on edge 50 of blackout divider 24 when edge is positioned in guiding groove 36 or 38.

In another exemplary embodiment, divider storage 32 is tensioned to exert a force on divider 24 assisting engaging member 48 in returning blackout divider 24 to a first position at least partially in divider storage 32.

Figure 8:
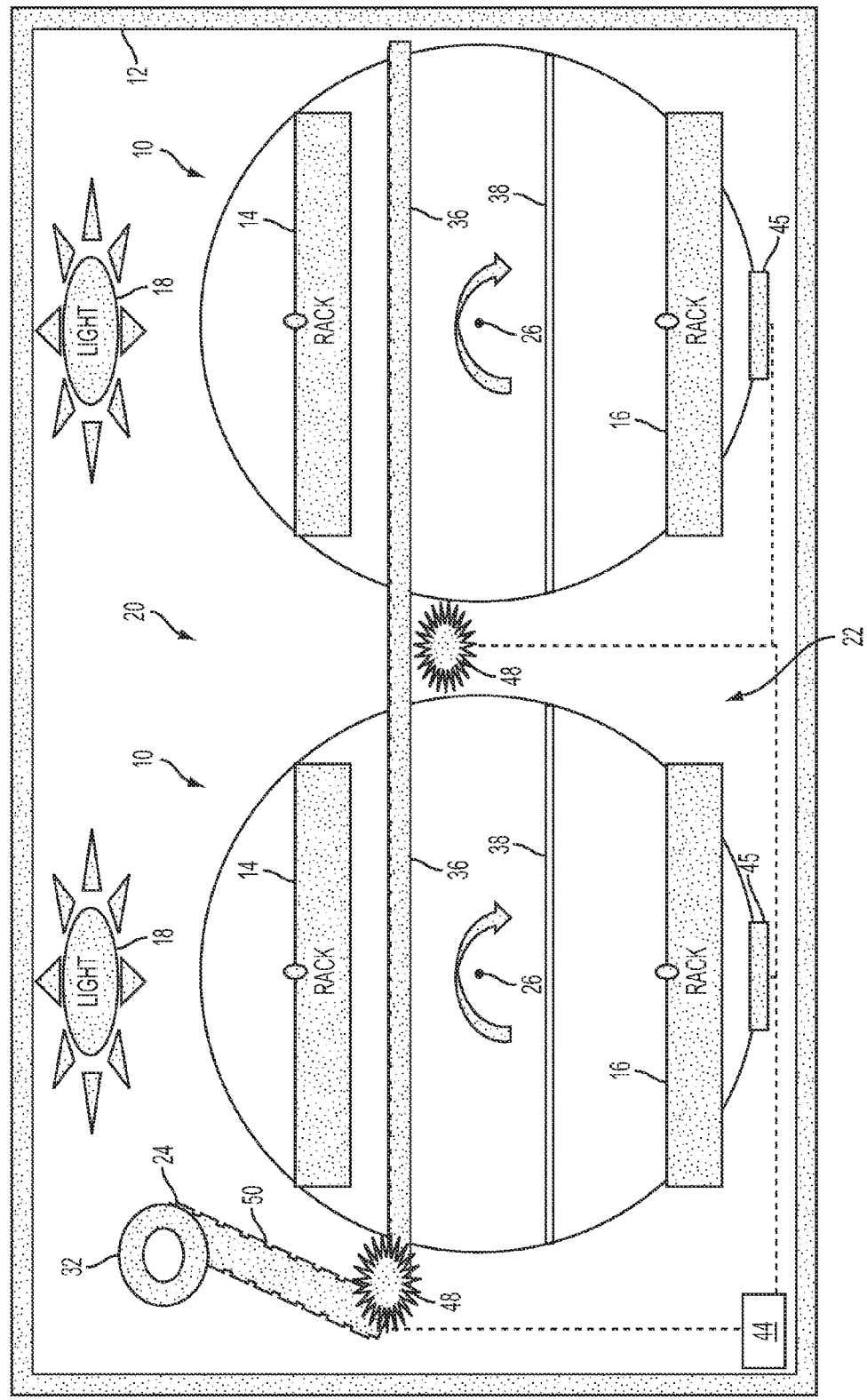
FIG. 8 illustrates a growth chamber including two exemplary carousels and an automatically positioned blackout divider inside a growth chamber.

FIG. 8 illustrates a growth chamber including two exemplary carousels inside a growth chamber. In one exemplary embodiment, blackout divider 24 is automatically positioned to create light region 20 and dark region 22 by engaging member 48 and controller 44. In another exemplary embodiment, the two carousels 10 share a single blackout divider 24. In still another exemplary embodiment each carousel 10 has its own blackout divider 24. In yet another exemplary embodiment, blackout divider or dividers 24 is manually positioned to create light region 20 and dark region 22 in growth chamber 12. In the exemplary embodiment illustrated in FIG. 8, two engaging members 48 are provided to assist moving blackout divider 24 between positions. Additional engaging members 48 may also be provided, each engaging member 48 being controlled by controller 44. In another exemplary embodiment, engaging members 48 may be provided in guiding grooves 36, 38.

Figure 9:
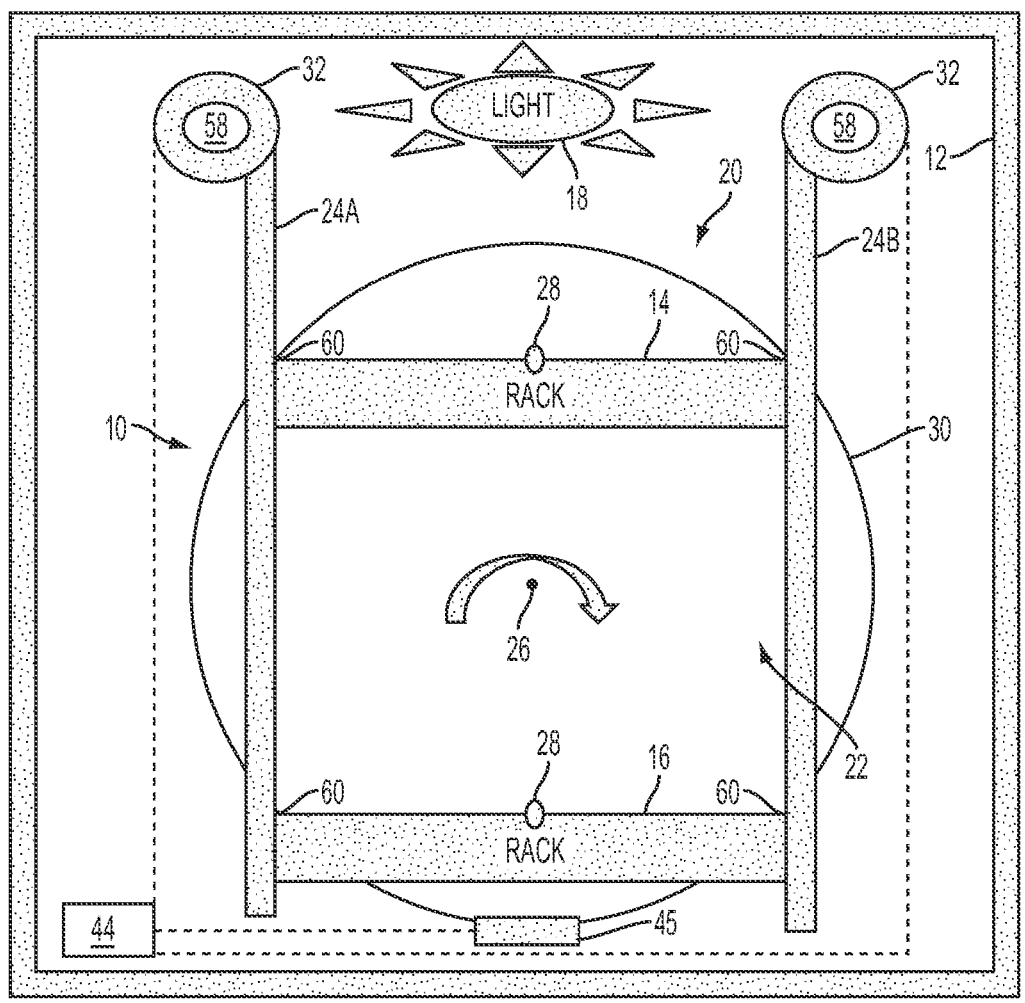
FIG. 9 illustrates an exemplary carousel including a second exemplary automatically positioned blackout divider in a light blocking position inside a growth chamber.

FIG. 9 illustrates another exemplary embodiment of carousel 10 in growth chamber 12 including an automatically positioned blackout divider 24. In the exemplary embodiment illustrated in FIG. 9, blackout divider 24 is comprised of two portions, 24A and 24B. FIG. 9 illustrates blackout divider 24 in a light blocking position. Blackout divider portions 24A, 24B and rack 14 cooperate to form light region 20 above rack 14, and dark region 22 between rack 14 and rack 16. In one embodiment, rack supports 14, 16 are impermeable to light or reduce the transmission of light low enough not to alter a target plant's photoperiod. In another embodiment, dark region 22 is bounded on the top and bottom by rack 14 and rack 16, on the sides by carousel wheels 30, and on the ends by blackout divider portions 24A, 24B.

In one embodiment, a plurality of attachments 60 attach blackout divider portions 24A, 24B to racks 14, 16 In one embodiment, attachments 60 are positioned on blackout divider portions 24A, 24B. In another embodiment, attachments 60 are positioned on racks 14, 16. Attachments 60 may include mechanical fasteners, magnetic fasteners, electromagnetic fasteners, or adhesive fasteners. Other suitable fasteners may also be used.

In another embodiment, attachments 60 are not used and blackout divider portions 24A, 24B are positioned near or in contact with edges of racks 14, 16 when blackout divider portions 24A, 24B are in the light blocking position to reduce the amount of light from light source 28 that reaches dark region 22.

In one exemplary embodiment, each blackout divider portion 24A, 24B is attached to divider storage 32 and motor 58. Motor 58 may comprise a single motor or a plurality of motors moving blackout divider portions 24A, 24B. Motor 58 moves blackout divider portions 24A, 24B between a light blocking position and a storage position. An exemplary light blocking position for blackout divider portions 24A, 24B is illustrated in FIG. 9 and an exemplary storage position is illustrated in FIG. 10.

Figure 10:
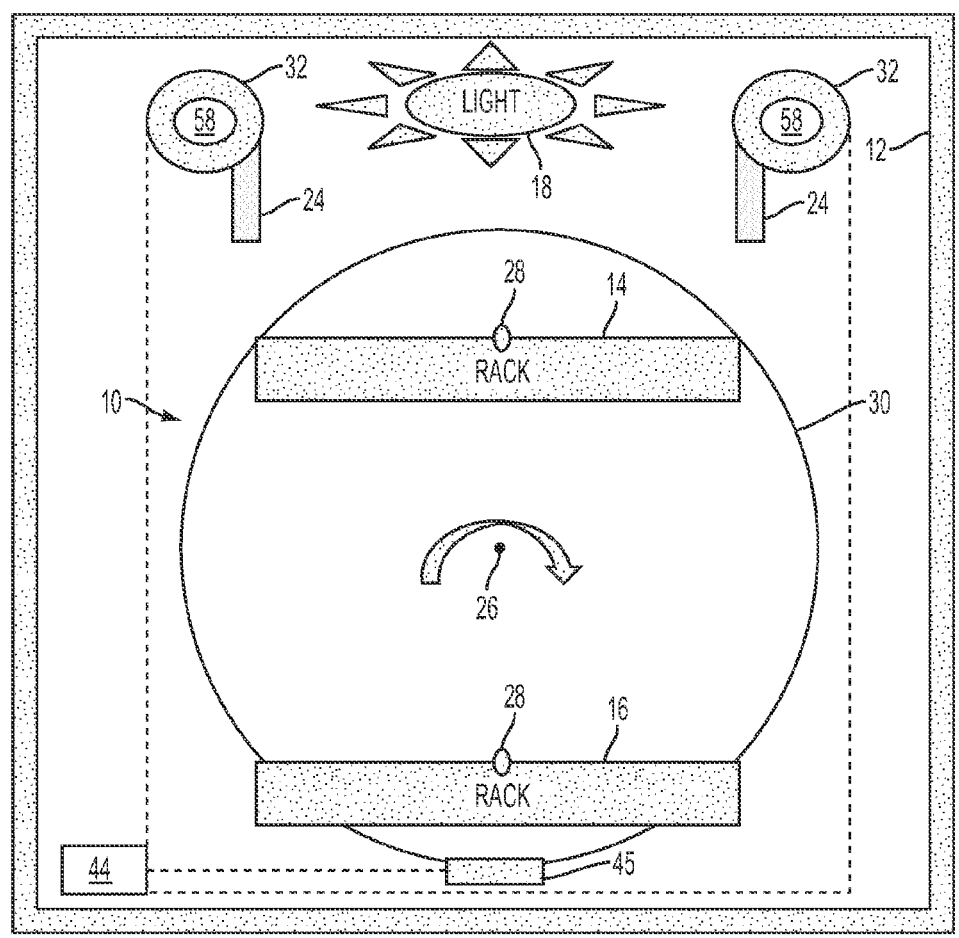
FIG. 10 illustrates the carousel and automatically positioned blackout divider of FIG. 9 in a storage position.

In the exemplary embodiment shown in FIG. 10, blackout divider portions 24A, 24B are rolled on divider storage 32, illustratively a roller. In one embodiment, divider storage 32 includes a roller or canister around motor 58. In another embodiment, blackout divider portions 24A, 24B are folded and stored in a divider storage. In still another embodiment, blackout divider portions 24A, 24B include a plurality of panels separated by strengthening members running across the length of blackout divider portions 24A, 24B, and a divider storage supports the strengthening members, allowing the panels to hang between the strengthening members similar to a Roman shade. In yet still another embodiment, blackout divider portions 24A, 24B include a plurality of rigid panels hinged together that allow blackout divider 24 to be positioned in a divider storage and moved by motor 58 into position dividing growth chamber 12 into light region 20 and dark region 22. Other suitable arrangements for embodiments for blackout divider portions 24A, 24B may be used.

In another embodiment, blackout divider portions 24A, 24B are manually moved between a light blocking position and a storage position. In still another embodiment, blackout divider portions 24A, 24B include an unattached bottom edge. In this embodiment, blackout divider portions 24A, 24B are not moved to a storage position prior to carousel wheel 30 rotating the position of racks 14, 16.

Controller 44 includes logic which may control operating of blackout divider 24 and the supporting structure 10. The logic of controller 44 may implemented in hardware or in hardware executing software. Exemplary software may be stored in memory. Controller 44 may include one or more processors or other structures to implement the logic of controller 44.

Memory is a computer readable medium and may be a single storage device or may include multiple storage devices, located either locally with controller 44 or accessible across a network. Computer-readable media may be any available media that may be accessed by controller 44 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by controller 44. In one embodiment, controller 44 communicates data, status information, or a combination thereof to a remote device for analysis. In another embodiment, memory may further include operating system software, such as WINDOWS operating system available from Microsoft Corporation of Redmond Wash. Memory further includes communications software if computer system has access to a network, such as a local area network, a public switched network, a CAN network, and any type of wired or wireless network. Any exemplary public switched network is the Internet. Exemplary communications software includes e-mail software, internet browser software. Other suitable software which permit controller 44 to communicate with other devices across a network may be used.

In another exemplary embodiment, growth chamber carousel 10 further includes one or more I/O modules which provide an interface between an operator and carousel 10. Exemplary I/O modules include input members and output members. Exemplary input members include buttons, switches, keys, a touch display, a keyboard, a mouse, and other suitable devices for providing information to controller. Exemplary output devices include lights, a display (such as a touch screen), printer, speaker, visual devices, audio devices, tactile devices, and other suitable devices for presenting information to an operator.

Figure 11:
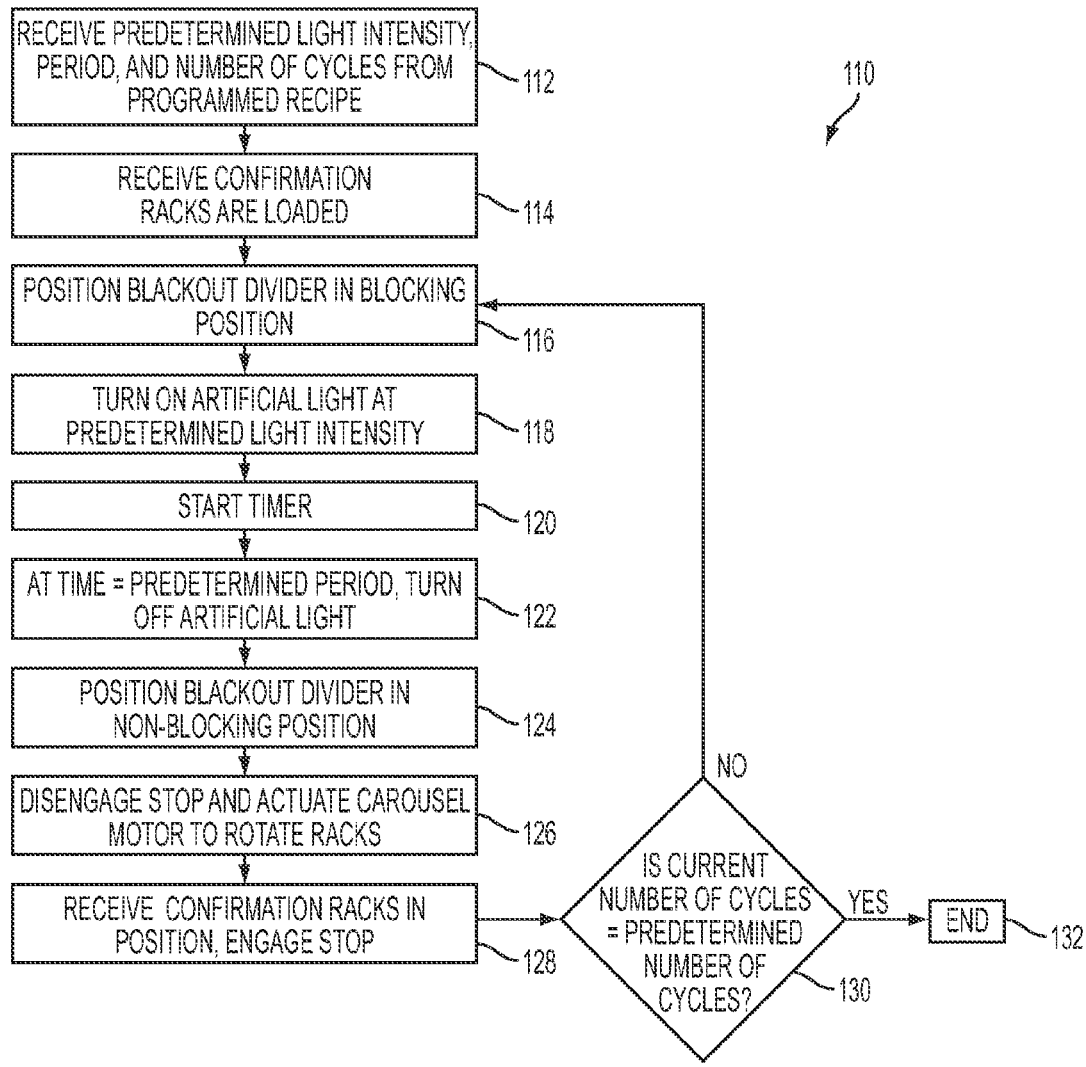
FIG. 11 illustrates an exemplary processing sequence for a controller controlling a growth chamber carousel.

Referring to FIG. 11, an exemplary processing sequence 110 for a controller 44 controlling a growth chamber carousel is shown. In the exemplary processing sequence, blackout divider 24 is stored in a first position at least partially in divider storage 32 at the beginning of sequence 110.

As shown in block 112, controller 44 receives information regarding light intensity, period, and number of cycles. In one exemplary embodiment, period is a continuous duration of time that a rack is illuminated by artificial light source 18. An exemplary period is twelve hours. In another exemplary embodiment, cycle is a count of the number of completed periods. This information may be stored in a memory accessible by controller, or it may be input by a user. In one exemplary embodiment, intensity is expressed as either on or off. In another exemplary embodiment, intensity is expressed as a percentage of full intensity values. In still another exemplary embodiment, a light intensity sensor (not shown) in communication with controller 44 positioned in light region 20 of growth chamber 12 monitors light intensity and controller 44 adjusts artificial light source 18 in response to the input light intensity and the light intensity sensor measurement.

Once the controller 44 receives confirmation that racks 14, 16 have been loaded, as shown in block 114, the controller positions blackout divider in a second position blocking light from one of racks 14, 16 and dividing growth chamber 12 into light region 20 and dark region 22, as shown in block 116. As shown in blocks 118 and 120, the controller then activates light source 18 at the inputted light intensity and starts a timer.

Controller 44 monitors timer until the timer reaches the inputted cycle period. Controller then deactivates light source 18 as shown in block 122. Controller then positions blackout divider back in a first position at least partially in divider storage 32, as shown in block 124. As shown in block 126, the controller then disengages the stop and actuates carousel motor 42 to rotate carousel 10 and attached racks 14, 16. Motor 42 rotates carousel 10 until rack 14, previously positioned in light region 20 of growth chamber 12 is positioned in dark region 22, and rack 16, previously positioned in dark region 22, is positioned in light region 20.

Once controller 44 receives confirmation that racks 14, 16 have moved to their new position, the stop is re-engaged, as shown in block 128.

Controller 44 determines whether the inputted number of cycles has been satisfied, as shown in block 130. If the current number of cycles is less than the inputted number of cycles, controller 44 positions blackout divider 24 between racks 14, 16, as shown in block 116, and performs another cycle. Once the number of cycles has been reached, controller 44 ends processing sequence 110, as shown in block 132. In one exemplary embodiment, controller 44 alerts a user or displays a result when the number of cycles has been reached.

In another exemplary embodiment, controller 44 is integrated with the controls of growth chamber 12. In still another exemplary embodiment, data points, such as temperature and humidity, are recorded by growth chamber 12 or controller 44 during each cycle of processing sequence 110.

In yet still another embodiment, a recipe including predetermined set points or information for one or more of temperature, humidity, light intensity, period, and number of cycle data is stored in memory and read by controller 44. A recipes can be inputted to memory by a user through an I/O module, an external memory device, or they may be received from a connected network or computer. Recipes may be recalled from memory by selection through an I/O module.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. A chamber for growing plants comprising:
an artificial light source;
a first plant support;
a second plant support;
a blackout divider separating the chamber for the first plant support and the second plant support into a light region that receives light from the artificial light source and a dark region, the blackout divider being moveable between a first divider position and a second divider position relative to first plant support and the second plant support; and
a supporting structure coupled to the first plant support and the second plant support, the supporting structure configured to move at least the first plant support between the light region of the chamber and the dark region of the chamber in response to the blackout divider moving to the first divider position.

2. The chamber for growing plants of claim 1, wherein when the supporting structure positions the first plant support in the light region of the chamber, the second plant support is positioned in the dark region of the chamber.

3. The chamber for growing plants of claim 2, wherein when the blackout divider is in the second divider position the blackout divider prevents movement of the first plant support between the light region of the chamber and the dark region of the chamber.

4. The chamber for growing plants of claim 1, wherein when the supporting structure positions the first plant support in the dark region of the chamber, the second plant support is positioned in the light region of the chamber.

5. The chamber for growing plants of claim 4, wherein when the blackout divider is in the second divider position the blackout divider prevents movement of the first plant support between the light region of the chamber and the dark region of the chamber.

6. A method for growing plants in a chamber including an artificial light source, the method comprising:
- positioning a first plant support in a first portion of the chamber;
- positioning a second plant support in a second portion of the chamber;
- dividing, with a moveable blackout divider, the first portion of the chamber including the first plant support, from the second portion of the chamber including the second plant support;
- moving the blackout divider to a first position relative to the first plant support and the second plant support; while the blackout divider is in the first position, positioning the first plant support in the second portion of the chamber relative to the blackout divider and the second plant support in the first portion of the chamber relative to the blackout divider; and
- moving the blackout divider to a second position, wherein when the blackout divider is positioned in the second position the first plant support is not moveable between the first portion of the chamber and the second portion of the chamber.

7. The method of claim 6, further comprising the step of positioning an artificial light source to illuminate the first portion of the chamber.

8. The method of claim 6, wherein the step of moving the blackout divider to the first position includes the step of rolling the divider.

* * * * *